United States Patent [19]

Suzuki

[11] Patent Number: 5,568,195
[45] Date of Patent: Oct. 22, 1996

[54] IMAGE PICKUP DEVICE WITH WHITE BALANCE FUNCTION

[75] Inventor: Masao Suzuki, Tokyo, Japan

[73] Assignee: Canon Kabushiki Kaisha, Tokyo, Japan

[21] Appl. No.: 329,264

[22] Filed: Oct. 26, 1994

Related U.S. Application Data

[63] Continuation of Ser. No. 4,681, Jan. 14, 1993, Pat. No. 5,386,229.

[30] Foreign Application Priority Data

Jan. 20, 1992 [JP] Japan ......................................... 4-7552

[51] Int. Cl.$^6$ ........................................................ H04N 9/73
[52] U.S. Cl. ............................ 348/227; 348/226; 348/228
[58] Field of Search ..................................... 348/222, 223, 348/226, 227, 228; 358/909.1, 29, 29 C, 41, 43, 44; H04N 9/04, 9/07, 9/73, 9/73 C

[56] References Cited

U.S. PATENT DOCUMENTS

| | | | |
|---|---|---|---|
| 4,879,591 | 11/1989 | Takei | 348/227 |
| 5,001,552 | 3/1991 | Okino . | |
| 5,255,077 | 10/1993 | Yamazaki et al. . | |
| 5,270,802 | 12/1993 | Takagi | 348/223 |
| 5,313,277 | 5/1994 | Suzuki | 348/223 |

FOREIGN PATENT DOCUMENTS

| | | |
|---|---|---|
| 0420621 | 4/1991 | European Pat. Off. . |
| 470769 | 2/1992 | European Pat. Off. . |
| 0470769 | 2/1992 | European Pat. Off. . |
| 62-189891 | 8/1987 | Japan . |
| 01255507 | 9/1989 | Japan . |
| 3141786 | 6/1991 | Japan . |
| 4317291 | 11/1992 | Japan . |

Primary Examiner—John K. Peng
Assistant Examiner—Sherrie Hsia
Attorney, Agent, or Firm—Morgan & Finnegan, L.L.P.

[57] ABSTRACT

An image pickup device capable of white balance control, independent from the color of light source or from the change in color temperature, without the influence of the object of high saturation and with adaptation to the change in color of the light source, and also capable of avoiding unpleasant color shift not matching the direction of color temperature change, is provided by detecting the luminance of external light and the presence of flicker by the microprocessing unit from the output of a photometry sensor, then accordingly varying the clipping range of a clipping circuit, also switching the method of calculating the white balance control values $R_{CD}$, $B_{CD}$ and varying the range of color correcting direction by the amplifiers.

7 Claims, 8 Drawing Sheets

IMAGE PICKUP DEVICE WITH WHITE BALANCE FUNCTION

This is a continuation of co-pending application Ser No. 08/004,681 filed Jan. 14, 1993, U.S. Pat. No. 5,386,229.

BACKGROUND OF THE INVENTION

1. Field of the Invention

The present invention relates to an image pickup device, and more particularly to an image pickup device with a function to control the white balance of the video signal obtained from the output of image pickup means.

2. Related Background Art

In recent image pickup devices such as of video movie cameras and electronic still cameras, the white balance is being controlled by a method of automatically maintaining satisfactory white balance in the obtained video signal utilizing the output of the image pickup element, namely the TTL auto-tracking white balance control.

An example of such white balance control method will be briefly explained in the following. In such image pickup device as mentioned above, the signal obtained from the image pickup element is generally converted, through a color separation circuit and a process circuit already known in the art, into a Y (luminance) signal, a R (red) - Y signal and a B (blue) - Y signal. In this process, variable-gain amplifiers are generally provided for the R and B signals or for the (R-Y) and (B-Y) signals.

The Y, (R-Y) and (B-Y) signals are respectively averaged, for example by integration, over a period of a field or longer, and these averaged signals are used for deriving R, G and B signals. These three primary color signals are used for deriving control signals for controlling said variable-gain amplifiers in such a manner that the ratio of said three primary color signals becomes equal to 1:1:1.

This method enables automatic white balance control, without relying on particular color measuring sensors.

On the other hand, the above-explained method, utilizing the output of the image pickup element for the white balance control, is associated with a drawback of being incapable of satisfactory white balance control by the influence of object, in case an object of high saturation occupies a large area in the image field.

It is therefore already known to provide a clipping circuit in front of the above-mentioned averaging step, thereby alleviating the influence of the object of high saturation.

Such clipping circuit is anticipated to provide the expected effect in case, as shown in FIG. 1A, the high level side (100) and the low level side (200) are evenly clipped, but, if the high level side (100) alone is clipped while the low level side (200) is not clipped as shown in FIG. 1B, because of the color of light source or of a variation in color temperature, the white balance control is affected by the signal of said low level side. Naturally a similar result occurs when the low level side (200) alone is clipped.

More specifically, in movie cameras in which the time constant of the above-mentioned averaging circuits is selected relatively long in order to gradually reach the appropriate white balance state, there will be required a long time before reaching the appropriate white balance state. On the other hand, in case the appropriate white balance has to be reached within a short time as in the electronic still cameras, there is encountered a drawback that the photo-taking operation is executed in a situation in which the white balance is not yet appropriate.

Also the aberration in white balance, resulting from the above-mentioned influence of object of high saturation, is not too conspicuous in case the color shift takes place corresponding to the variation in color temperature of black body radiation, namely in case of color shift toward red or blue, but becomes visually very unpleasant in case a color shift toward green or purple is involved.

Such visually unpleasant aberration of the white balance can be avoided by simply limiting the direction of color correction in the white balance control approximately to a direction corresponding to the variation of color temperature, but, in such case, the white balance control cannot be achieved under a light source which is greenish in comparison with the black body radiation, such as the fluorescent lamp.

SUMMARY OF THE INVENTION

In consideration of the foregoing, an object of the present invention is to resolve the above-mentioned drawbacks.

Another object of the present invention is to provide an image pickup device capable of satisfactory white balance control regardless of the color of light source or of the variation in color temperature, without the influence of an object of high saturation occupying a large area in the image frame.

The above-mentioned objects can be attained, according to an aspect of the present invention, by an image pickup device comprising:

image pickup means;

a clipping circuit for clipping large amplitude components of plural color signals obtained from the output of said image pickup means;

white balance control means for controlling the white balance of a video signal obtained from the output of the image pickup means, utilizing the output of the clipping circuit;

light metering means for measuring the luminance of external light; and clip varying means for varying the clipping range of the clipping circuit according to the output of the light metering means.

Still another object of the present invention is to provide an image pickup device capable of responding to a variation in color of the light source, and of avoiding unpleasant aberration in color, not corresponding to the change in color temperature.

The above-mentioned object can be attained, according to another aspect of the present invention, by an image pickup device comprising:

image pickup means;

a clipping circuit for clipping large amplitude components in plural color signals obtained from the output of the image pickup means;

white balance control means for controlling the white balance of a video signal obtained from the output of the image pickup means, utilizing the output of the clipping circuit;

flicker detection means for detecting the presence of flicker; and clip varying means for varying the clipping range of the clipping circuit according to the output of said flicker detection means.

DETAILED DESCRIPTION OF THE PREFERRED EMBODIMENTS

Now the present invention will be clarified in detail by an embodiment thereof.

1ST EMBODIMENT

Figure 1A:
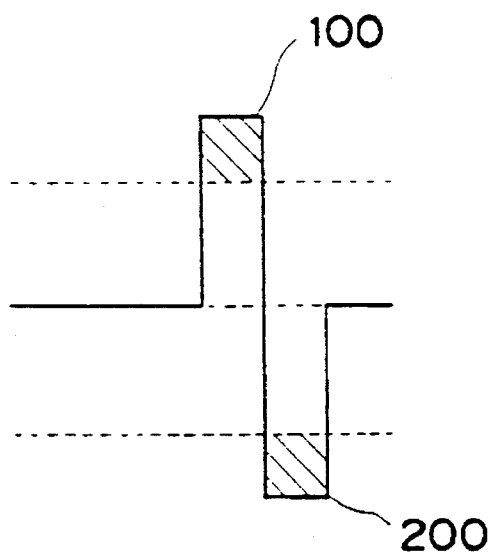
FIGS. 1A and 1B are wave form charts for explaining unevenness in the clipping range.
Figure 1B:
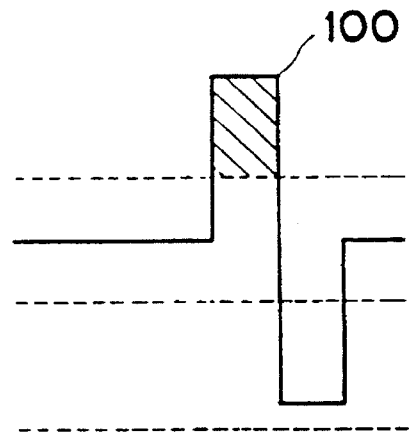
Figure 2:
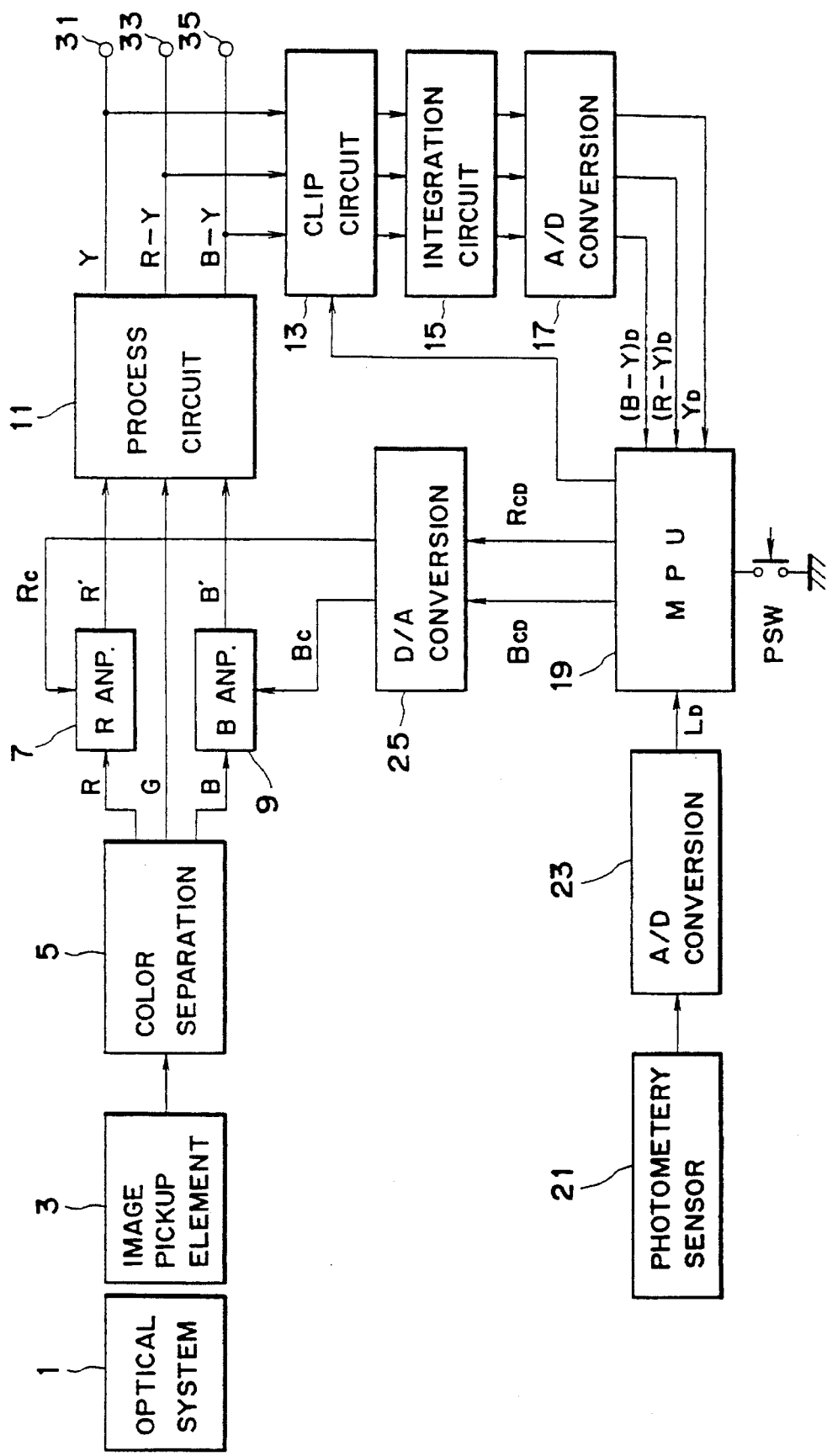
FIG. 2 is a block diagram of an image pickup device embodying the present invention.

FIG. 2 is a schematic block diagram showing the configuration of an image pickup device, constituting a first embodiment of the present invention.

In FIG. 2 there are shown an optical system 1 for focusing the light reflected from an object and limiting the amount of said light; an image pickup element 3 for converting the object image, formed through said optical system 1, into an electrical signal; a known color separation circuit 5 for extracting R, G and B signals from the output of said image pickup element; R- and B-amplifiers 7, 9 for respectively amplifying the R and B signals; and a process circuit 11 for deriving Y, (R-Y) and (B-Y) signals from R'- and B'-signals from the R- and B-amplifiers and from the G signal.

There are also shown a peak-peak (P—P) clipping circuit 13 for clipping the high and low level portions of Y, R-Y and B-Y signals from the process circuit 11; an integrating circuit 15 for respectively integrating three signals released from the clipping circuit 13; an A/D converter 17 for effecting analog-to-digital (A/D) conversion on the three signals from the integrating circuit 15, thereby providing three digital values $Y_D$, $(R-Y)_D$ and $(B-Y)_D$; and a microprocessing unit (MPU) 19 to which said digital values are supplied.

There are also provided a photometry sensor 21 for measuring the luminance of the object; an A/D converter 23 for effecting A/D conversion on the output of the photometry sensor 21; a D/A converter 25 for effecting D/A conversion on digital control values $R_{CD}$, $B_{CD}$ released from the MPU 19, thereby providing outputs for controlling the gains of said R-amplifier 7 and B-amplifier 9; a power switch PSW of the image pickup device; and output terminals 31, 33, 35.

Figure 3:
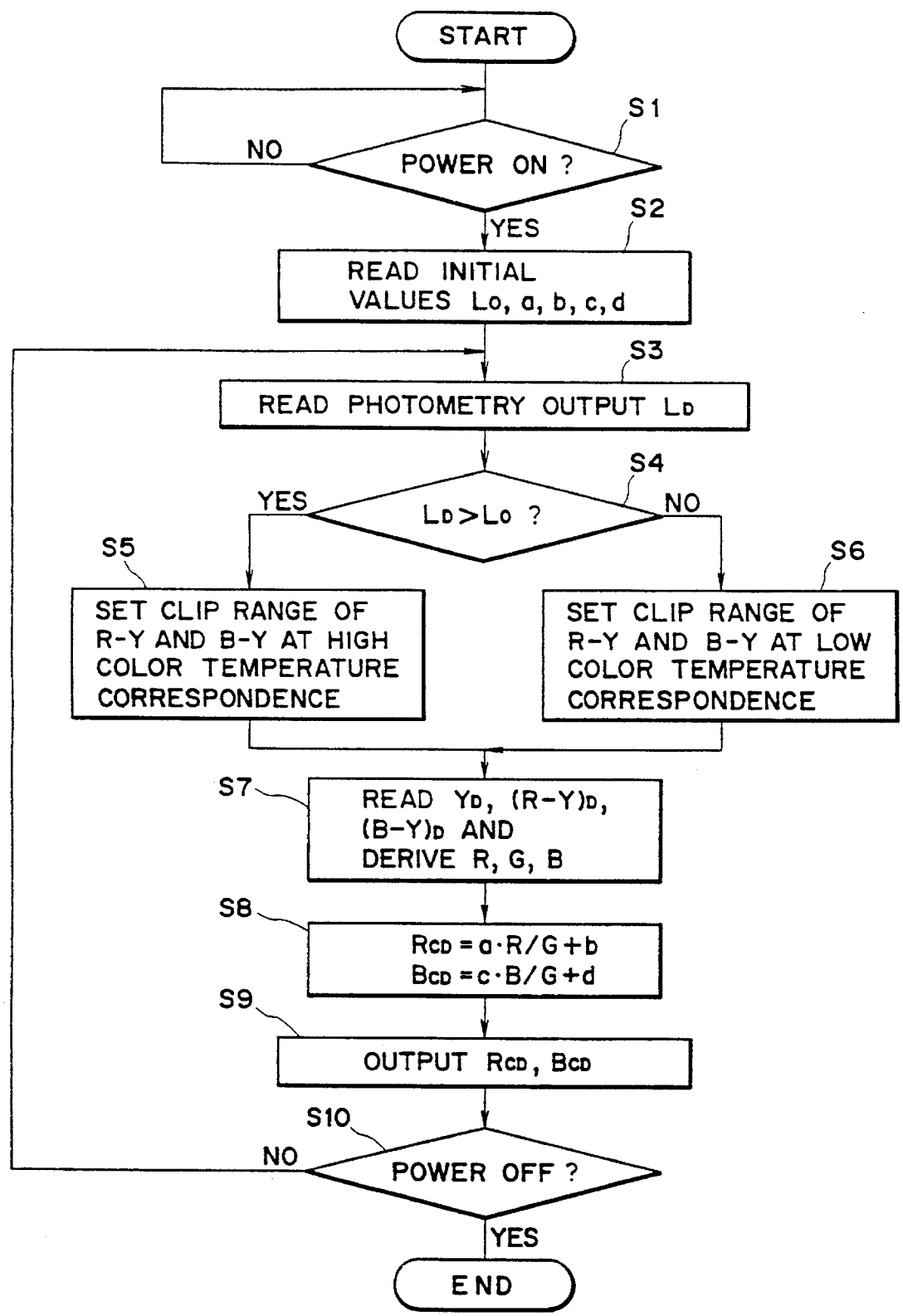
FIG. 3 is a flow chart showing the function of a first embodiment of the image pickup device of the present invention.

FIG. 3 is a flow chart showing the function of the MPU 19 of the present embodiment. In the following there will be explained the functions of the present embodiment, with reference to FIG. 3.

When the power switch PSW is turned on (step S1), the various units of the device are powered. The light from the object is focused by the optical system 1 onto an image pickup face of the image pickup element 1, with the control of amount of the light, and the electrical signal from said image pickup element 3 is processed by the color separation circuit 5, according to the filter arrangement of the element 3, thereby providing R, G and B signals. Among these signals, the R and B signals are amplified by the R-amplifier 7 and B-amplifier 9, with gains respectively determined by control signals $R_C$, $B_C$ to be explained later The output signals R', B' of said R- and B-amplifiers 7, 9 are supplied, together with the G signal, to the process circuit 11.

Based on said R', B' and G signals, the process circuit 11 releases Y, (R-Y) and (B-Y) signals, which are supplied, through the output terminals 31, 33, 35, to external circuits and a record/reproducing unit.

Also these three signals are converted, through the clipping circuit 13, integrating circuit 15 and A/D converter 17, into digital values $Y_D$, $(R-Y)_D$, $(B-Y)_D$ which are supplied to the MPU 19.

On the other hand, the output of the photometry sensor 21 is also converted by the A/D converter 23 into a digital value $L_D$ which is supplied to the MPU When the power switch PSW is turned on, the MPU 19 stores initial values $L_0$, a, b, c and d in an internal memory. $L_0$ is a digitized value of the signal from the sensor 21, obtained from the object of a certain luminance, corresponding to the brightest indoor illumination. Also said values a, b, c and d are to be utilized in the calculation for deriving the white balance control voltage and are preset at optimum values.

Figure 4A:
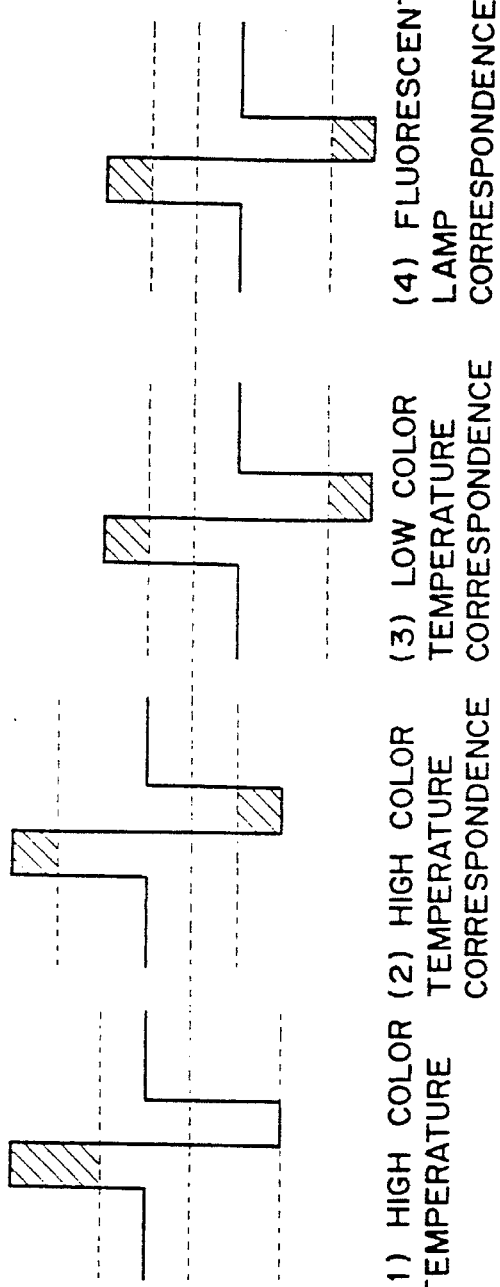
FIGS. 4A and 4B are wave form charts for explaining the varying operation for the clipping range in the image pickup device embodying the present invention.

Then a step S3 fetches the digital value $L_D$ of the output of photometry, and a step S4 compares $L_0$ and $L_D$. If $L_D > L_0$, the sequence proceeds to a step S5 for shifting the clipping range of the P—P clipping circuit 13 to a range corresponding to a high color temperature. More specifically, for the (R-Y) signal, the clipping range is shifted to the high level side, in order to avoid a situation (1) in FIG. 4A in which the high level portion (indicated by hatched area) alone is clipped. As a result, the clipping is effected, as shown in (2) in FIG. 4A, almost evenly at the high and low level sides.

Figure 4B:
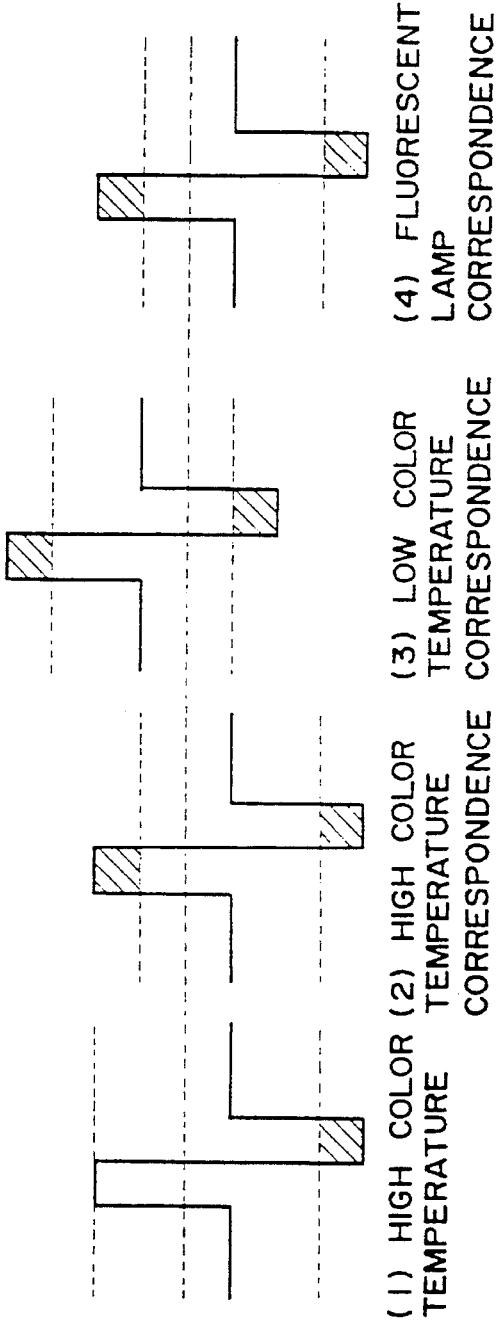

Also for the (B-Y) signal, in order to avoid a situation in which, as shown in (1) in FIG. 4B, the low level portion alone is clipped, the clipping range is shifted to the low level side as indicated in (2) in FIG. 4B.

Figure 5:
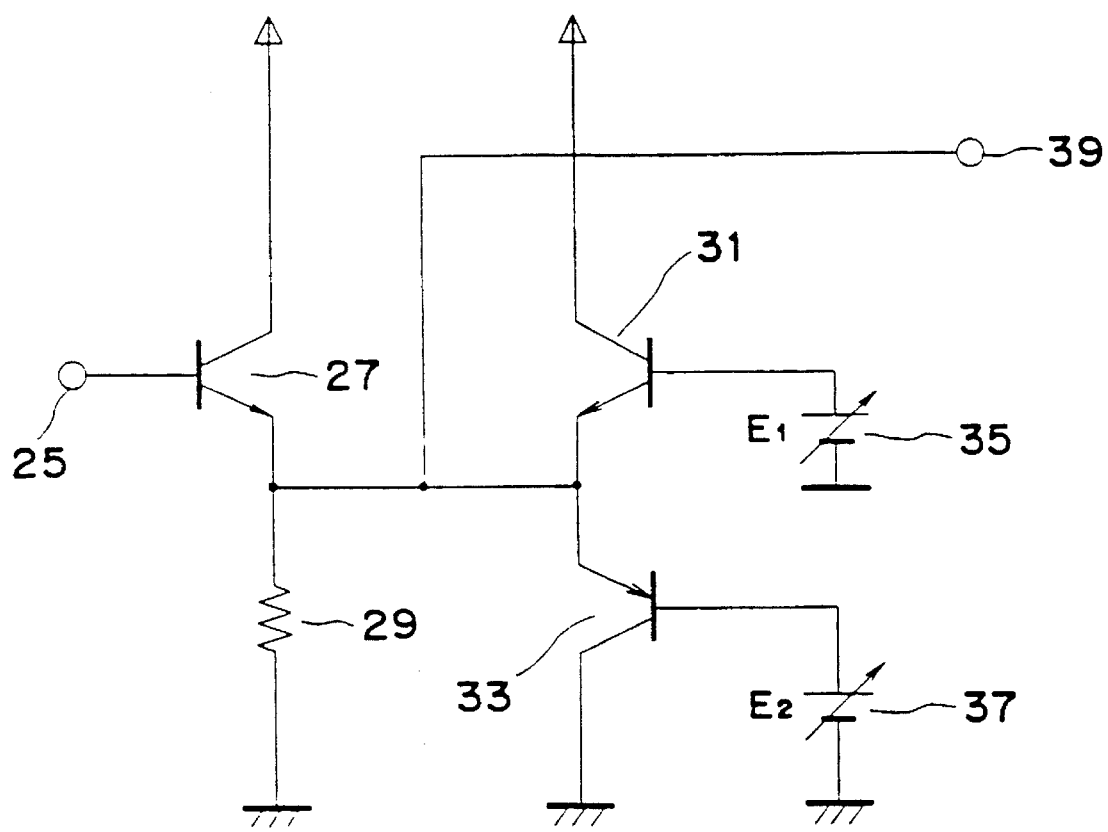
FIG. 5 is a circuit diagram showing the structure of a P—P clipping circuit in FIG. 2.

An example of the clipping circuit with variable clipping range is shown in FIG. 5, in which provided are transistors 27, 31, 33, a resistor 29, and reference voltage sources 35, 37. In such circuit configuration, the clipping range can be shifted to the high level side or to the low level side, by respectively shifting the voltages E1, E2 of the reference voltage sources 35, 37 to high levels or low levels.

If the output of photometry is higher than the aforementioned level, the phototaking situation can be generally anticipated under direct sunlight or under a cloudy sky, and the probability that the light source is of a high color temperature is extremely high. Consequently such variation in the clipping range provides, with an extremely high probability, almost even clippings at the high and low level sides. It is therefore possible to effectively eliminate the aforementioned influence of object of high saturation.

On the other hand, if the condition $L_D>L_0$ is not met in the step S4, the external light source is presumed as indoor light, and the sequence proceeds to a step S6 for shifting the clipping range to a range corresponding to a low color temperature. More specifically, the clipping range for the (R-Y) signal is shifted to the low level side as indicated in (3) in FIG. 4A, and that for the (B-Y) signal is shifted to the high level side as indicated in (3) in FIG. 4B. In this manner the clipping can be made approximately even at the high and low level sides, so that the influence of the object of high saturation can be effectively eliminated.

After the determination of the clipping range in the step S5 or S6, a step S7 fetches the digital values YD, $(R-Y)_D$ and $(B-Y)_D$ from the A/D converter 17 and derives R, G and B signals by matrix calculation from said digital values.

Then a step S8 determines the control value $R_{CD}$ for the R-amplifier 7 by an equation a·R/G+b, and the control value $B_{CD}$ for the B-amplifier 9 by an equation c·B/G+d. Thus obtained digital values $R_{CD}$, $B_{CD}$ are supplied, in a step S9, to the D/A converter 25, and converted into analog control voltages $R_C$, $B_C$ which are used for controlling the gains of the R-amplifier 7 and the B-amplifier 9, thereby achieving white balance control.

The above-explained process is repeated until the power switch PSW is turned off. When said power switch PSW is turned off (S10), the sequence is terminated.

As explained in the foregoing, the first embodiment of the present invention can effectively eliminate the influence of the object of high saturation on the white balance control in various situations, by varying the clipping ranges of the P—P clipping circuit 13 for the color difference signals R-Y and B-Y according to the luminance of external light.

In the above-explained embodiment, either of two clipping ranges is selected, based on a threshold value of the luminance, but it is also possible to select one of three or more clipping ranges, in order to avoid abrupt color change in the vicinity of varying point of the clipping range. It is also possible to vary the clipping range in gradual manner with a certain time constant.

2ND EMBODIMENT

In the following there will be explained a second embodiment of the present invention, in which the configuration of the image pickup device is same as that of the first embodiment shown in FIG. 2, and will not, therefore, be explained further.

Figure 6:
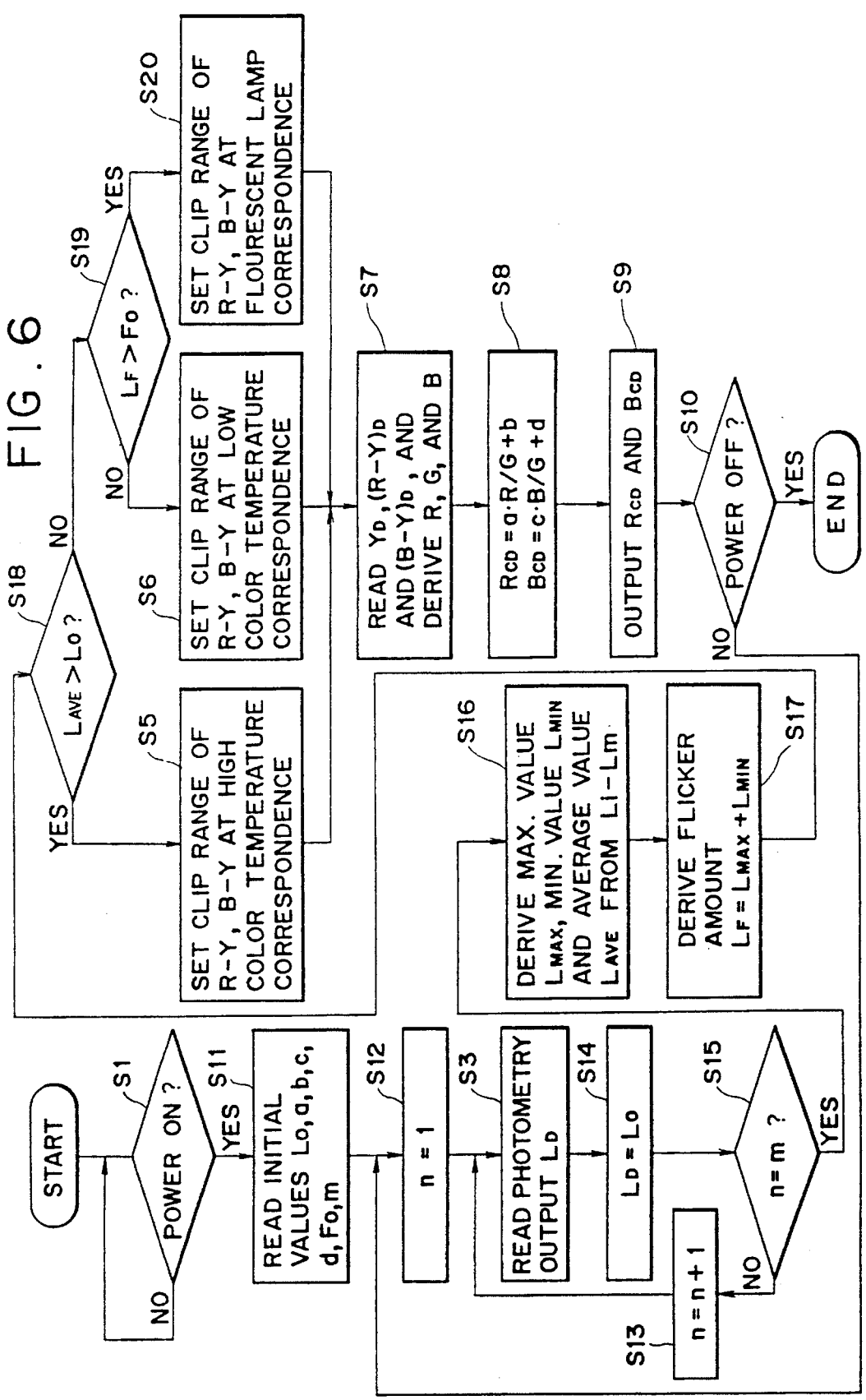
FIG. 6 is a flow chart showing the function of a second embodiment of the image pickup device of the present invention.

In the following there will be explained the functions of the MPU 19 in the present embodiment, with reference to a flow chart in FIG. 6, in which same steps as Those in FIG. 3 are represented by same symbols.

In the present embodiment, the initial values to be fetched at the start-up of the device after the closing of the power switch PSW include, in addition to those $L_0$, a b, c and d in the first embodiment, a constant m indicating the number of readings of the photometry output, and a reference value $F_0$ for detecting the presence of flicker (step S11).

Then a step S12 set a variable n at "1", and, when the step S3 fetches the digital value $L_D$ as the output of photometry, a step S14 sets said digital value $L_D$ as $L_n$. Then a step S15 compares n and m, and, if n≠m, a step S13 effects a stepwise increment of n to n+1. Then the sequence returns to the step S3, and the above-explained sequence is repeated.

Thus, by the time n=m is identified in the step S15, digital values representing the photometry outputs at mutually different times have been set as $L_1$–$L_m$. Then a step S16 extracts the maximum value $L_{MAX}$ and the minimum value $L_{MIN}$ from $L_1$–$L_m$, then calculates the average $L_{AVE}$ of $L_1$–$L_m$, and also calculates $L_{MAX}+L_{MIN}$ as a value $L_F$ indicating the amount of flicker.

A next step S18 compares $L_{AVE}$ with $L_0$. This step S18 has a similar meaning to the step S4 in the first embodiment, and, in case of $L_{AVE}>L_0$, the step S5 shifts the clipping range of the P—P clipping circuit 13 to a range corresponding to a high color temperature, as in the first embodiment.

On the other hand, if the condition $L_{AVE}>L_0$ is denied in the step S18, the sequence proceeds to a step S19 for comparing the value $L_F$, indicating the amount of flicker, with the reference value $F_0$. If a condition $n_F>F_0$ is denied, the flicker is identified to be absent, and the sequence proceeds to the step S6 in which the clipping range of the P—P clipping circuit 13 is shifted, as in the first embodiment, to a range corresponding to a low color temperature.

On the other hand, if the step S19 identifies a situation $L_F>F_0$, there is identified the presence of flicker, and, the light source in this case being presumed as a fluorescent lamp, the clipping range of the P—P clipping circuit 13 is shifted to a range corresponding to the fluorescent lamp. More specifically, in consideration of the light from the object illuminated by the fluorescent lamp, the clipping levels for the (R-Y) and (B-Y) signals are shifted to the low level side, as indicated in (4) in FIGS. 4A and 4B. This is based on a fact that the light of the fluorescent lamp is greenish in comparison with the black body radiation.

The calculation of the white balance control voltage in the step S7 and thereafter is conducted in the same manner as in the first embodiment, and the digital values $R_{CD}$, $B_{CD}$ for white balance control are released in the step S9.

The above-explained embodiment is capable, in addition to the effects of the first embodiment, of identifying an indoor situation in case the external light is not bright, then detecting the presence or absence of flicker thereby identifying whether the light source in said indoor situation is a fluorescent lamp, and varying the clipping ranges of the P—P clipping circuit 13 in such a manner that the clipping takes place evenly at the high and low level sides even under the relatively frequently encountered fluorescent lamp. The device can therefore cover more diversified situations, and the probability of influence of the object of high saturation on the white balance control can be further reduced.

In the second embodiment explained above, the light source is presumed to be composed of the fluorescent lamp only when the external light has a low luminance and the presence of flicker is detected. However, since the indoor phototaking operations can be expected to be executed mostly under the illumination with the fluorescent lamp, it is naturally possible to switch the clipping range to the high color temperature range or to the fluorescent lamp range, solely depending on the detection of flicker.

3RD EMBODIMENT

Figure 7:
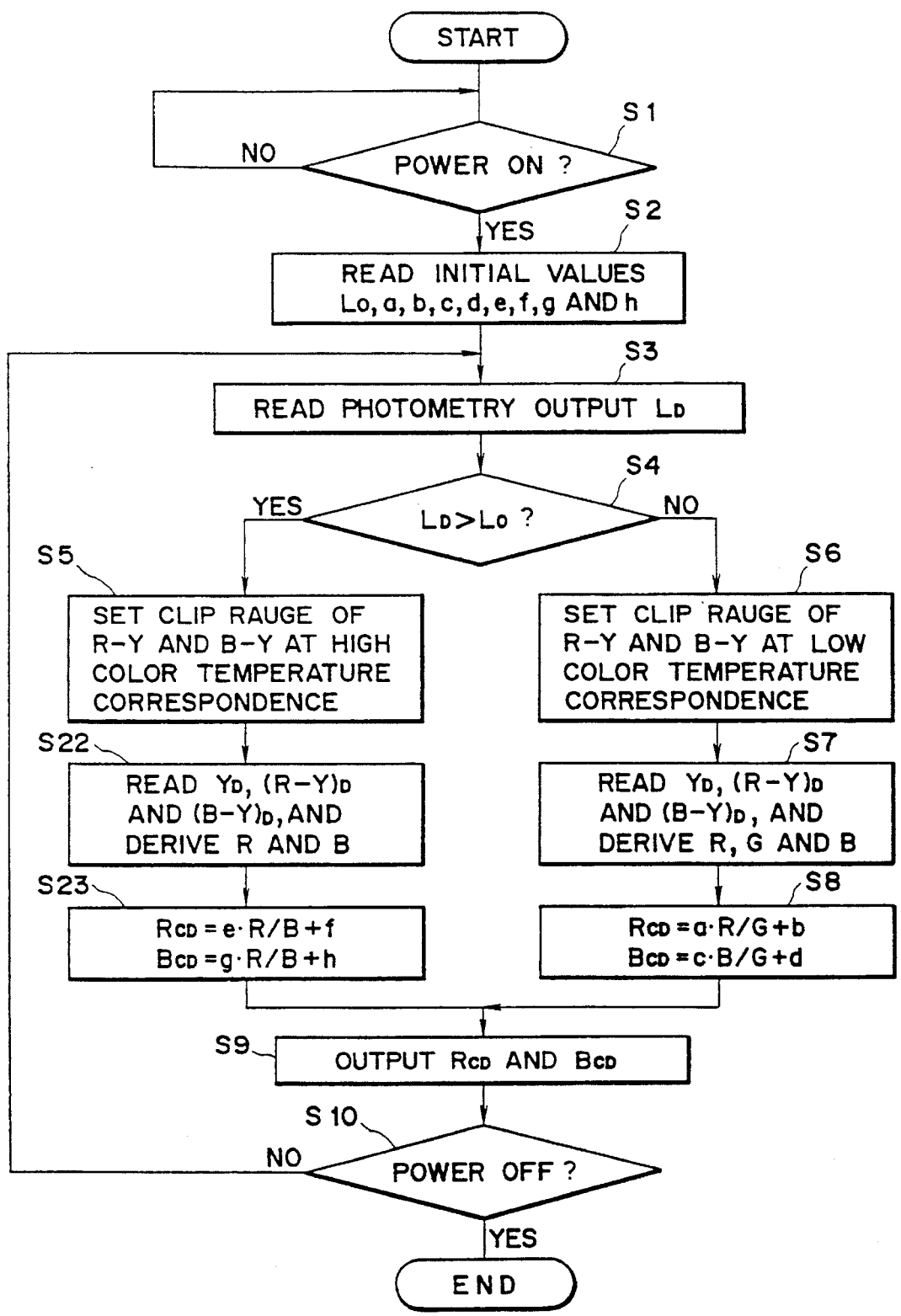
FIG. 7 is a flow chart showing the function of a third embodiment of the image pickup device of the present invention.

In the following there will be explained a third embodiment of the present invention, in which the configuration of the image pickup device is same as that in the foregoing first embodiment. FIG. 7 is a flow chart showing the functions of the MPU 19 in the present embodiment, in which same steps as those in FIG. 3 are represented by same symbols.

The image pickup device of the present embodiment, like that of the first embodiment, discriminates in the step S4 whether the external light exceeds a certain luminance level, and, in case said level is exceeded, shifts the clipping range of the P—P clipping circuit 13 to a range corresponding to the high color temperature, but the method of calculating the white balance control values $R_{CD}$ and $B_{CD}$ is modified from that in the first embodiment.

More specifically, in the present embodiment, at the initial value fetching (step S2) after the closing of the power switch PSW, there are fetched values e, f, g and h for use in the calculation of the white balance control voltage, in addition to the aforementioned values a, b, c and d. Then, if the step S4 identifies that the external light exceeds a certain luminance level, the step S5 shifts the clipping range of the P—P clipping circuit 13 to a range corresponding to the high color temperature, and a step S22 derives R and B signals from $Y_D$, $(R-Y)_D$ and $(B-Y)_D$, for example by $R=Y_D+(R-Y)_D$ and $B=Y_D+(B-Y)_D$.

Also a step S23, utilizing said R and B signals, determines the control value $R_{CD}$ for the R-amplifier by $e \cdot R/B+f$, and the control value $B_{CD}$ for the B-amplifier 9 by $g \cdot R/B+h$. In such white balance control relying solely on R and B, the color correction takes place only in the direction of color temperature change in the black body radiation. It is therefore rendered possible to prevent unpleasant color aberration, such as color variation toward green or purple, not matching the color temperature change mentioned above.

On the other hand, if the step S4 identifies that the external light does not exceed said certain level, the step S6 shifts the clipping range of the P—P clipping circuit 13 to a range corresponding to the low color temperature, and steps S7 and S8 calculate the white balance control values $R_{CD}$, $B_{CD}$ in the same manner as in the first embodiment. In this calculation, since $R_{CD\ and\ BCD}$ are respectively determined by $a \cdot R/G+b$ and $c \cdot B/G+d$, the color correction is possible also outside the direction of color temperature change.

In case the external light is dark, there can be considered various light sources, so that the white balance control has to be made corresponding to the variation in the color of the light source, for example corresponding to the greenish color in case of the fluorescent lamp. In this case, therefore, the color correction has to be made even outside the direction of color temperature change. On the other hand, in case the external light is bright, the light source can be most certainly estimated as the solar light, so that the color correction outside the direction of color temperature change is scarcely required, whereas the unpleasant color shift resulting from the aforementioned influence of object may become a problem.

Consequently the present embodiment can correct the white balance in satisfactory manner even under the illumination with fluorescent lamp, and can prevent unplesant color shift in the outdoor situation.

In the present embodiment, the clipping range of the P—P clipping circuit 13 is shifted depending on whether the external light exceeds a certain luminance level, but, even without said shift of the clipping range, there can still be obtained the effects of satisfactorily correcting the white balance even under the illumination with fluorescent lamp and of preventing unpleasant color shift in the outdoor situation.

Also in the present embodiment the method of calculation of the white balance control value is switched at a threshold value of the luminance, but it is also possible to vary the control value in gradual manner with a certain time constant, in order to avoid an abrupt change in color.

4TH EMBODIMENT

Figure 8:
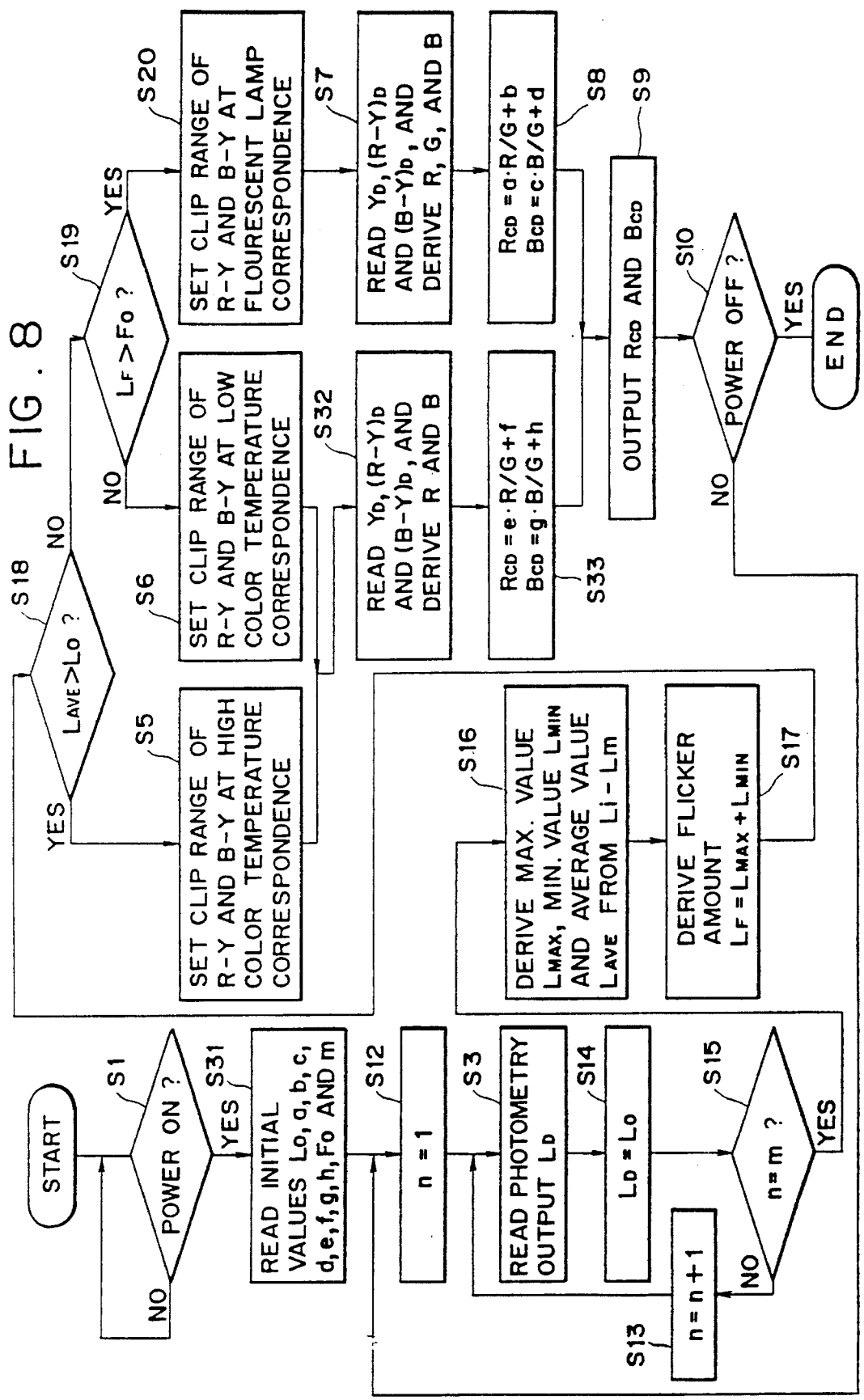
FIG. 8 is a flow chart showing the function of a fourth embodiment of the image pickup device of the present invention.

In the following there will be explained a fourth embodiment of the present invention, in which the configuration of the image pickup device is same as that in the foregoing first embodiment. FIG. 8 is a flow chart showing the functions of the MPU 19 in the present embodiment, wherein steps equivalent to those in FIGS. 3, 6 and 7 are represented by same symbols.

In the present embodiment, the luminance of the external light is identified by the calculation of $L_{AVE}$ in the same manner as in the second embodiment, and the presence of flicker is identified from $L_F$ $(=L_{MAX}-L_{MIN})$. Also in the present embodiment, as in the foregoing second embodiment, the clipping range of the P—P clipping circuit 13 is selected from a range corresponding to high color temperature, a range corresponding to low color temperature, and a range corresponding to the fluorescent lamp.

Besides, only when the flicker is detected in the step S19, the values $R_{CD}$, $B_{CD}$ are determined by a $\cdot R/G+b$ and $c \cdot B/G+d$ to enable color correction outside the direction of color temperature change, and, in other situations, said values $R_{CD}$, $B_{CD}$ are determined by $e \cdot R/B+f$ and $g \cdot R/B+h$ for enabling color correction only in the direction of color temperature change. Such configuration enables to identify, more exactly, the necessity for color correction outside the direction of color temperature change, and to prevent, in a larger number of occasions, the generation of color shift, resulting from unnecessary color correction outside the direction of color temperature change.

In the foregoing embodiments, the luminance of external light is measured by the photometry sensor 21, but it is also possible to judge the amount of light from the diaphragm aperture value and the shutter speed limiting the amount of incident light. In such case the present invention may be realized without the photometry sensor.

The image pickup devices of the foregoing embodiments may be applied to movie cameras and electronic still cameras. In case of application to electronic still cameras, as disclosed in the Japanese Patent Application No. 1-255507 of the present applicant, the white balance control for the photo-taking of still image (main exposure) may be conducted at a pre-exposure preceding said phototaking of still image, and the above-mentioned steps of photometry to calculation of white balance control value may be conducted at said pre-exposure operation.

As explained in the foregoing, the image pickup device of the present invention can always properly clip the color signals even under various color temperatures or light sources of various colors, by varying the clipping range of the clipping circuit according to the luminance of the external light or to the presence or absence of flicker therein, thereby enabling white balance control regardless of the color temperature or the color of light source at the phototaking operation and without the influence of the object of high saturation.

It is also rendered possible to prevent unpleasant shift in the white balance and to enable white balance control under various light sources, by varying the range of direction of color correction by the white balance control means, according to the luminance of the external light or to the presence or absence of flicker, as explained above.

What is claimed is:
1. An image pickup apparatus comprising:
   image pickup means for photoconverting an image of an object into an electrical signal;

detecting means for detecting a low brightness condition of said object; and shifting means for shifting a white balance control range of color difference components of said electrical signal corresponding to a fluorescent lamp when said low brightness condition is detected by said detecting means.

2. An image pickup apparatus according to claim 1, wherein said detecting means includes a photometric sensor.

3. An image pickup apparatus according to claim 1, further comprising white balance control means for controlling a white balance of said electrical signal.

4. An image pickup apparatus according to claim 3, wherein said shifting means shifts the white balance control range of the color difference components of said electrical signal corresponding to the fluorescent lamp by changing a clipping level of a white balance control signal used for said white balance control.

5. An image pickup apparatus comprising:

image pickup means for photoconverting an image of an object into an electrical signal;

white balance control means for controlling a white balance of said electrical signal;

detecting means for detecting a low brightness condition of said object; and shifting means for shifting a white balance control range of color difference components of said electrical signal corresponding to a fluorescent lamp when said low brightness condition is detected by said detecting means.

6. An image pickup apparatus according to claim 5, wherein said detecting means includes a photometric sensor.

7. An image pickup apparatus according to claim 5, wherein said shifting means shifts the white balance control range of the color difference components of said electrical signal corresponding to the fluorescent lamp by changing a clipping level of a white balance control signal used for said white balance control.

\* \* \* \* \*